United States Patent
Itou et al.

(10) Patent No.: US 9,448,457 B2
(45) Date of Patent: Sep. 20, 2016

(54) OPTICAL MODULATOR

(71) Applicant: Sumitomo Osaka Cement Co., Ltd., Tokyo (JP)

(72) Inventors: Takatomo Itou, Tokyo (JP); Minoru Shinozaki, Tokyo (JP); Yukihiro Yazawa, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 14/402,537

(22) PCT Filed: May 24, 2013

(86) PCT No.: PCT/JP2013/064529
§ 371 (c)(1),
(2) Date: Nov. 20, 2014

(87) PCT Pub. No.: WO2013/176270
PCT Pub. Date: Nov. 28, 2013

(65) Prior Publication Data
US 2015/0147018 A1    May 28, 2015

(30) Foreign Application Priority Data
May 25, 2012  (JP) .................................. 2012-120186

(51) Int. Cl.
*G02F 1/035* (2006.01)
*G02F 1/225* (2006.01)
(Continued)

(52) U.S. Cl.
CPC ........... *G02F 1/225* (2013.01); *H04B 10/5053* (2013.01); *H04B 10/5561* (2013.01); *G02B 6/2817* (2013.01); *G02F 2001/212* (2013.01)

(58) Field of Classification Search
CPC ...... G02F 1/025; G02F 1/0356; G02F 1/225; G02F 1/2255
USPC ............................................................ 385/3
See application file for complete search history.

(56) References Cited

U.S. PATENT DOCUMENTS

| 2006/0056002 A1* | 3/2006 | Wooten et al. ............... 359/245 |
| 2011/0013907 A1* | 1/2011 | Sugihara ............... G02F 1/0123 398/38 |

(Continued)

FOREIGN PATENT DOCUMENTS

| JP | 56-033691 B | 8/1981 |
| JP | 63-266405 A | 11/1988 |

(Continued)

OTHER PUBLICATIONS

Japense Patent Office, International Search Report issued in corresponding International Patent Application No. PCT/JP2013/064529 and English translation, mailed Jun. 25, 2013 (4 pages).

(Continued)

Primary Examiner — Jerry Blevins
(74) Attorney, Agent, or Firm — Wood, Herron & Evans, LLP

(57) ABSTRACT

An optical modulator according to the present invention includes an optical branching section having at least one beam splitter and a mirror and configured to branch input light, a lens configured to converge the respective lights branched in the optical branching section, a plurality of phase modulation sections each configured to perform phase modulation of each light which is input thereto through the lens, and an optical combining section configured to combine a plurality of phase-modulated lights which are output from the plurality of phase modulation sections, and output modulated signal light.

12 Claims, 5 Drawing Sheets

(51) Int. Cl.
*H04B 10/50* (2013.01)
*H04B 10/556* (2013.01)
*G02B 6/28* (2006.01)
*G02F 1/21* (2006.01)

(56) References Cited

U.S. PATENT DOCUMENTS

2012/0020613 A1* 1/2012 Kondou et al. ............. 385/14
2013/0021658 A1* 1/2013 Miao .................. G02B 27/283
359/256

FOREIGN PATENT DOCUMENTS

| JP | 64-070723 A | 3/1989 |
| JP | 03-501080 A | 3/1991 |
| JP | 03-119328 A | 5/1991 |
| JP | 03-213822 A | 9/1991 |
| JP | 04-121607 A | 4/1992 |
| JP | 04-134306 A | 5/1992 |
| JP | 04-158591 A | 6/1992 |
| JP | 06-109417 A | 4/1994 |
| JP | 08-029115 A | 2/1996 |
| JP | 11-258454 A | 9/1999 |
| JP | 2000171487 A | 6/2000 |
| JP | 2007271783 A | 10/2007 |
| JP | 2009094988 A | 4/2009 |
| JP | 2009244682 A | 10/2009 |
| JP | 2011-075739 A | 4/2011 |

OTHER PUBLICATIONS

Japanese Patent Office, Notice of Reasons for Rejection issued in corresponding Japanese Patent Application No. 2012-120186 and English translation, mailed Jun. 18, 2013 (13 Pages).

Japanese Patent Office, Notice of Reasons for Rejection issued in corresponding Japanese Patent Application No. 2012-120186 and English translation, mailed Apr. 8, 2014 (7 Pages).

* cited by examiner

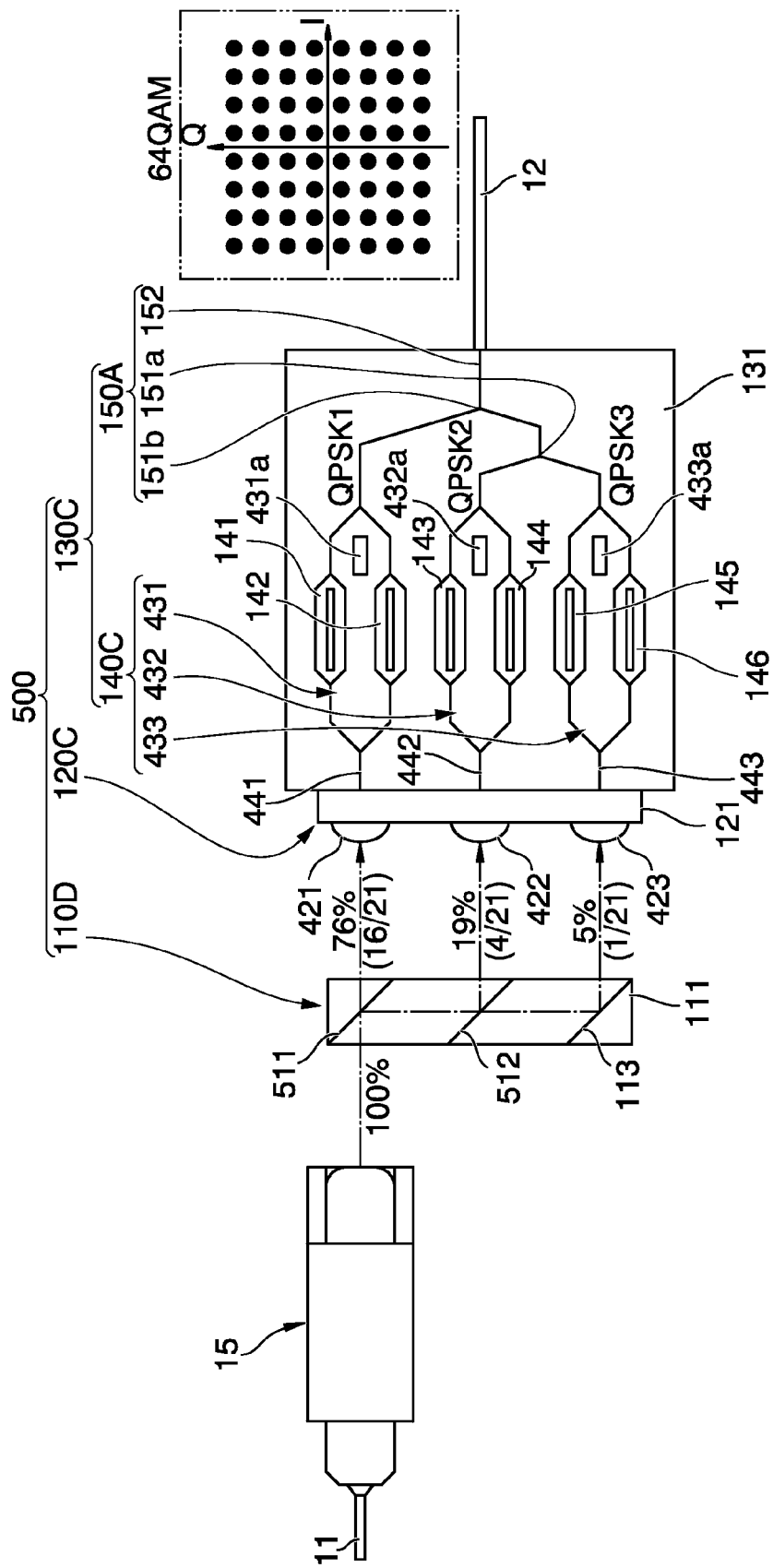

OPTICAL MODULATOR

TECHNICAL FIELD

The present invention relates to an optical modulator which outputs a quadrature amplitude modulation (QAM) signal.

This application claims the right of priority based on Japanese Patent Application No. 2012-120186 filed with the Japan Patent Office on May 25, 2012, the contents of which are incorporated herein by reference.

BACKGROUND ART

As a multilevel modulation type modulator, a QAM modulator is known (refer to, for example, PTLs 1 and 2).

A modulator described in PTL 1 obtains a 16QAM signal by providing a loss section (6 dB) on one of output arm portions and superimposing quadri-phase shift keying (QPSK) signals in which an output difference therebetween is 6 dB. Further, a configuration is adopted in which an input-output branching section is formed as a planar optical waveguide (PLC) on a glass substrate and the glass substrate is optically connected to a lithium niobate substrate. On the other hand, also in an optical modulator described in PTL 2, an optical power ratio is adjusted to a quarter by providing an optical power adjustment section on one of arms and providing a light attenuation amount of −6 dB.

In any modulator of PTLs 1 and 2, since an optical signal is attenuated on one of arms, an optical loss is large, and the substrate becomes bigger caused by providing the optical power adjustment section.

Further, in the modulator described in PTL 1, due to a structure in which different types of substrates are optically connected, there is a case where an optical losing at a joint point occurs or a difference in coefficient of thermal expansion causes the breakage of modulator.

CITATION LIST

Patent Literature

[PTL 1] Japanese Laid-open Patent Publication No. 2009-094988
[PTL 2] Japanese Laid-open Patent Publication No. 2009-244682

SUMMARY OF INVENTION

Technical Problem

An aspect of the present invention provides a modulator made so as to be able to suppress an optical loss without increasing the size of a substrate.

Solution to Problem

According to an aspect of the present invention, there is provided an optical modulator including: an optical branching section having at least one beam splitter and one mirror and configured to branch input light; lenses configured to converge the respective lights branched in the light branching section; a plurality of phase modulation sections, each of which is configured to perform phase modulation of each light which is input thereto through the lens; and a light combining section configured to combine a plurality of phase-modulated lights, which are output from the plurality of phase modulation sections, and output the modulated signal light.

According to this configuration, since the lights which are input to the phase modulation sections are generated by branching using the beam splitter and the generated lights are input through the lenses, a plurality of lights having adjusted power can be generated with almost not causing an optical loss. By this reason, comparing with a case where power adjustment is performed after phase modulation, it is possible to reduce an optical loss. Further, since it is not necessary to form a structure for power adjustment on a substrate with a phase modulation section provided thereon, it is possible to reduce the size of the substrate. Further, since a structure of joining optical waveguides of different types of substrates is also not required, it is possible to configure an optical modulator with excellent manufacturability and reliability.

A configuration in which the plurality of phase modulation sections are formed on a single substrate is also applicable.

A configuration in which the lens is one of a microlens, a microlens array, and a rod lens is also applicable.

A configuration in which the optical branching section outputs a plurality of lights having different intensities from one another is also applicable.

A configuration in which an optical element is provided which inputs collimated light to the light branching section is also applicable.

A configuration in which at least one of the beam splitter and the mirror has a dielectric multilayer film is also applicable.

A configuration in which the lens is fixed to the phase modulation section directly or through other optical element is also applicable.

Advantageous Effects of Invention

According to the aspect of the present invention, in a QAM modulator, by adopting a configuration of branching input light by using a beam splitter and a lens, it is possible to suppress an optical loss without increasing the size of a substrate.

BRIEF DESCRIPTION OF DRAWINGS

FIG. 5 is a diagram showing an optical modulator according to a fifth embodiment.

DESCRIPTION OF EMBODIMENTS

First Embodiment

Hereinafter, embodiments of the present invention will be described with reference to the drawings.

Figure 1:
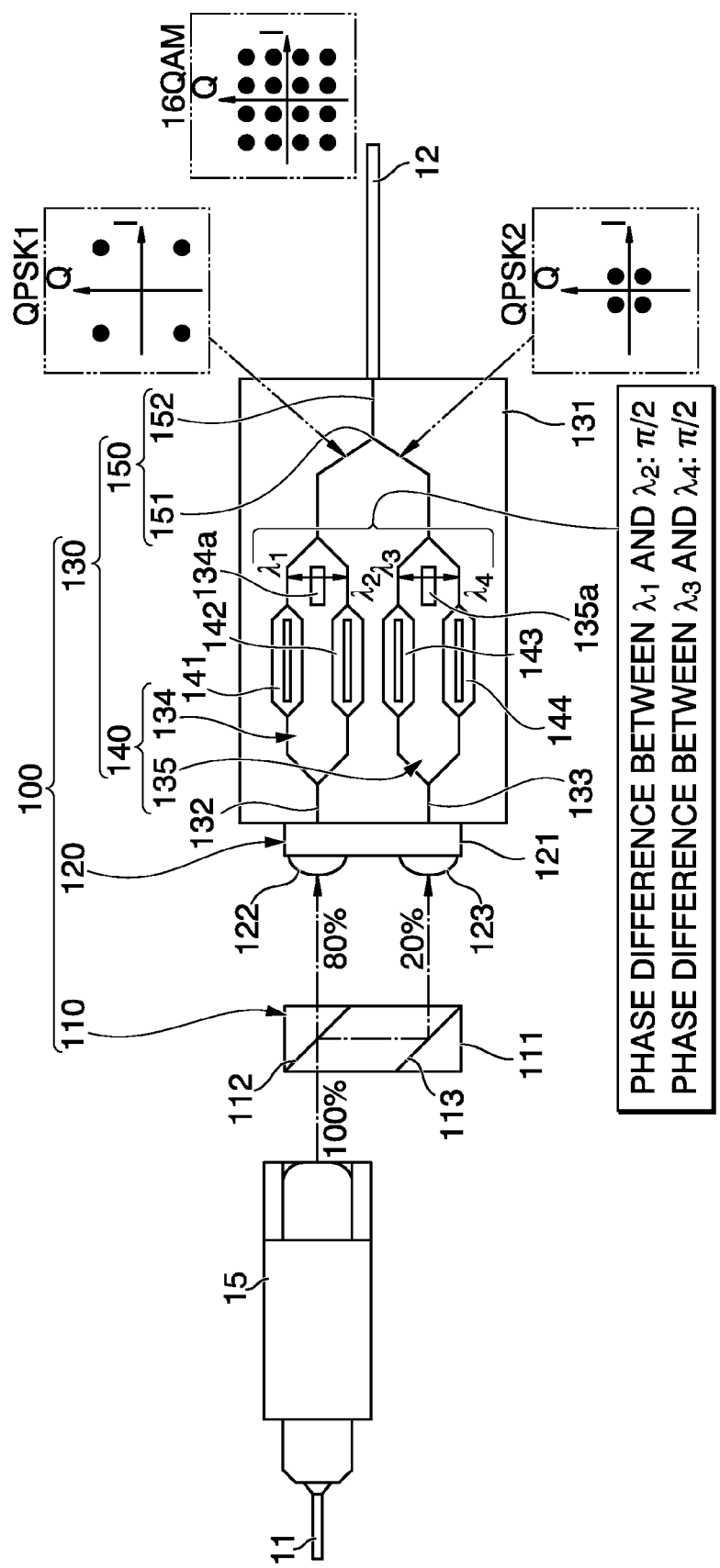
FIG. 1 is a plan view of an optical modulator according to a first embodiment.

FIG. 1 is a plan view of an optical modulator according to a first embodiment.

An optical modulator 100 of the first embodiment is provided with an optical branching section 110, a microlens array (a lens) 120, and an optical waveguide element 130. An optical fiber collimator 15 which makes collimated light incident to the optical modulator 100 is disposed on the light input side of the optical modulator 100. An optical fiber 11, the base end side of which is connected to a laser light source (not shown in FIG. 1), is connected to the optical fiber collimator 15. An optical fiber 12 is connected to the light output side of the optical modulator 100.

The optical branching section 110 has a configuration in which a beam splitter 112 and a mirror 113 disposed parallel to each other are provided in a glass base 111. The optical branching section 110 branches incident laser light into two laser lights by the beam splitter 112 and launches the laser light transmitted through the beam splitter 112 and the laser light reflected by both the beam splitter 112 and the mirror 113. In the case of the first embodiment, the beam splitter 112 is set so as to have a transmittance of 80% and a reflectance of 20% with respect to the laser light which is input from the optical fiber collimator 15. The mirror 113 is a total reflection mirror. An antireflective film (an AR coat) or the like may be formed on the light incident surface or the light launched surface of the optical branching section 110. At least one of the beam splitter 112 and the mirror 113 may have a dielectric multilayer film.

The microlens array 120 has a rectangular parallelepiped-shaped transparent substrate 121, and two microlenses 122 and 123 formed on one surface (the surface facing the optical branching section 110) of the substrate 121. The respective optical axes of the two microlenses 122 and 123 are disposed coaxially with the optical axes of the two laser lights which are launched from the optical branching section 110. The surface opposite to the surface on which the two microlenses 122 and 123 are disposed on the substrate 121 is optically bonded to the optical waveguide element 130. The substrate 121 has a thickness equivalent to the focal lengths of the microlenses 122 and 123. The laser lights incident on the microlenses 122 and 123 are focused on input ends of optical waveguides formed on the side end face of the optical waveguide element 130.

The optical waveguide element 130 has a substrate 131, and optical waveguides and electrodes formed on the substrate 131. An optical modulating section 140 and an optical combining section 150 are formed on the same substrate with the optical waveguides and the electrodes.

The substrate 131 is a lithium niobate (LiNbO$_3$) substrate in the case of the first embodiment. As the substrate 131, lithium tantalate, PLZT (lead lanthanum zirconate titanate), a quartz-based material, and the combination of these can be used.

The optical modulating section 140 has Mach-Zehnder waveguides 134 and 135. The Mach-Zehnder waveguide 134 has phase modulation sections 141 and 142. The Mach-Zehnder waveguide 135 has phase modulation sections 143 and 144. Each of the phase modulation sections 141 to 144 has a Mach-Zehnder waveguide and an electrode.

Two input waveguides 132 and 133 extend from a side end of the substrate 131 joined to the microlens array 120. The input waveguides 132 and 133 are respectively connected to the Mach-Zehnder waveguides 134 and 135 each having two arms. The phase modulation sections 141 and 142 are provided on the respective arms of the Mach-Zehnder waveguide 134. A bias electrode portion 134a is provided on the output end side of the Mach-Zehnder waveguide 134. The phase modulation sections 143 and 144 are provided on the respective arms of the Mach-Zehnder waveguide 135. A bias electrode portion 135a is provided on the output end side of the Mach-Zehnder waveguide 135.

The phase modulation sections 141 to 144 perform binary phase shift keying (BPSK) modulation on input optical signals and output the modulated signals. The phase modulation sections 141 and 142 are set in operation such that their phase changes are orthogonal to each other. Further, the phase modulation sections 143 and 144 are also set in operation such that their phase changes are orthogonal to each other. Each of the Mach-Zehnder waveguides 134 and 135 configures a quadri-phase shift keying (QPSK) type optical modulator. An optical signal modulated in each of the Mach-Zehnder waveguides 134 and 135 is output to the optical combining section 150.

The optical combining section 150 has an optical coupling portion 151 converging optical waveguides which respectively extend from output ends of the Mach-Zehnder waveguides 134 and 135 and an output waveguide 152 extending from the optical coupling portion 151 to a side end of the substrate 131. The optical coupling portion 151 has a waveguide configuration in which an optical branching ratio can be adjusted, such as a directional coupler or a multi-mode interference (MMI) coupler and a like. Optical signals QPSK1 and QPSK2 which are output from the Mach-Zehnder waveguides 134 and 135 are combined at the optical coupling portion 151 so as to maintain the intensity ratio of these, and thus 16QAM optical signal is generated. The generated 16QAM signal is output to the optical fiber 12 through the output waveguide 152.

Next, the optical modulator 100 of the first embodiment having the above-described configuration will be described.

Laser light supplied through the optical fiber 11 and expanded to a predetermined diameter by the optical fiber collimator 15 is incident on the optical modulator 100. The incident light is incident on the beam splitter 112 of the optical branching section 110. The beam splitter 112 transmits 80% of the incident light and reflects 20% of the incident light.

The light transmitted through the beam splitter 112 is incident on the microlens 122 and is focused on the input end of the input waveguide 132 by the microlens 122. On the other hand, the light reflected by the beam splitter 112 is reflected by the mirror 113, thereafter, is incident on the microlens 123, and is focused on the input end of the input waveguide 133 by the microlens 123.

The light introduced into the input waveguide 132 is branched at the input end of the Mach-Zehnder waveguide 134. Next, the branched lights are modulated in the phase modulation sections 141 and 142 and then adjusted, by the application of voltage to the bias electrode portion 134a, so that a phase difference between the branched lights is predetermined value ($\pi/2$). The lights having an adjusted phase difference are combined at the output end of the Mach-Zehnder waveguide 134 and become the optical signal QPSK1. The optical signal QPSK1 is output to the optical combining section 150.

The light introduced into the input waveguide 133 is branched at the input end of the Mach-Zehnder waveguide 135. Next, the branched lights are modulated in the phase modulation sections 143 and 144 and then adjusted, by the application of voltage to the bias electrode portion 135a, so that a phase difference between the branched lights is predetermined value ($\pi/2$). The lights having an adjusted phase difference are combined at the output end of the Mach-Zehnder waveguide 135 and become the optical signal QPSK2. The optical signal QPSK2 is output to the optical combining section 150.

In the case of the first embodiment, the light which is introduced into the input waveguide 133 is light with intensity of 20% branched by the beam splitter 112. For this reason, the optical signal QPSK2 which is output from the Mach-Zehnder waveguide 135 has a power, which is a quarter of that of the optical signal QPSK1 generated from the light having intensity of 80%. In the optical combining section 150, the optical signal QPSK1 and the optical signal QPSK2 having the above-described power ratio are combined, whereby the 16QAM signal is generated.

In addition, the power ratio (4:1) between the optical signals QPSK1 and QPSK2 may be shifted to some extent due to a manufacturing error of the optical modulator 100. For example, there is also a case where the above-described ratio is 3:1 or 5:1. The above-described ratio can also be adjusted by the transmittance and the reflectance of the beam splitter 112 in the optical branching section 110.

As described in detail above, in the optical modulator 100 of the first embodiment, the laser light is branched at the optical branching section 110 so that the branched lights have a predetermined power ratio and these laser lights are introduced into the optical waveguide element 130 through the microlens array 120. In the optical branching section 110, when the laser light is branched, an optical loss almost does not occur, and therefore, comparing with the configuration of the related art in which a power adjustment section for an optical signal is provided on a lithium niobate substrate, it is possible to reduce an optical loss.

Specifically, in a case where the incident laser light is branched into two laser lights, the respective QPSK signals are generated, and then the intensity of one of the QPSK signals is adjusted to a quarter thereof, the intensity of the 16QAM signal to be output is 62.5% of the incident laser light. In contrast to such a configuration, in the optical modulator 100 of the first embodiment, the optical loss of 1.6 dB (37.5%) is improved with respect to only the theoretical optical loss.

Further, the power adjustment section as described above is formed on a lithium niobate substrate, on the other hand, in the first embodiment, it is enough only to provide a QPSK modulator without a power adjustment section and an optical combining section. Therefore, in contrast to the configuration in which the power adjustment section is provided, it is possible to reduce the size of the substrate 131 made of lithium niobate or the like.

Further, in the optical modulator 100 of the first embodiment, the laser lights branched in the optical branching section 110 are focused on the input waveguides 132 and 133 by the microlenses 122 and 123 and introduced into the optical waveguide element 130. Therefore, there is no difficulty of manufacturing as in a case where optical waveguides formed on different types of substrates are connected to each other—and a breakage caused by a difference of the expansion coefficient between substrates or a problem of an optical loss caused by joint shift also does not occur.

Second Embodiment

Next, a second embodiment will be described with reference to FIG. 2.

Figure 2:
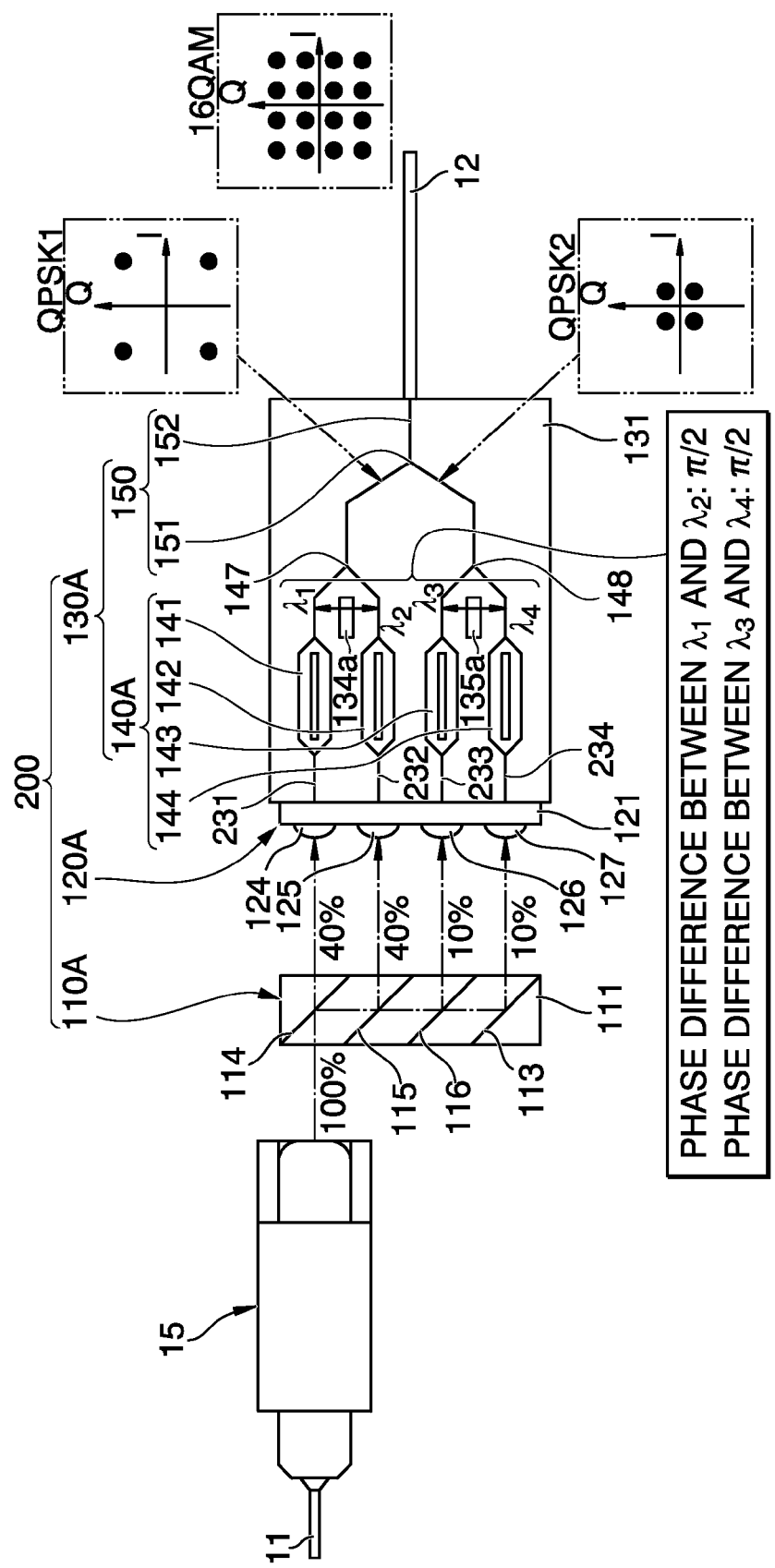
FIG. 2 is a diagram showing an optical modulator according to a second embodiment.

FIG. 2 is a diagram showing an optical modulator according to the second embodiment.

In addition, in the below embodiment, configuration elements which are common to the previous embodiment is denoted by the same reference number and a detailed description thereof will be simplified or omitted.

An optical modulator 200 of the second embodiment has an optical branching section 110A, a microlens array 120A, and an optical waveguide element 130A, as shown in FIG. 2.

The optical branching section 110A has a configuration in which beam splitters 114, 115, and 116 and the mirror 113 disposed parallel to each other are provided in the glass base 111. The optical branching section 110A branches incident laser light into four laser lights by the beam splitters 114 to 116 and launches the laser lights to the outside. An antireflective film (an AR coat) or the like may be formed on the light incident surface or the light launched surface of the optical branching section 110A.

The laser light transmitted through the beam splitter 114, the laser light reflected by both the beam splitter 114 and the beam splitter 115, the laser light reflected by the beam splitter 114, transmitted through the beam splitter 115, and then reflected by the beam splitter 116, and the laser light reflected by the beam splitter 114, transmitted through both the beam splitters 115 and 116, and then reflected by the mirror 113 are launched from the optical branching section 110A.

In the case of the second embodiment, the beam splitter 114 is set so as to have a transmittance of 40% and a reflectance of 60% for incident light. The beam splitter 115 is set so as to have a transmittance of 33% and a reflectance of 67% for incident light. The beam splitter 116 is set so as to have a transmittance of 50% and a reflectance of 50% for incident light. The mirror 113 is a total reflection mirror.

The microlens array 120A has the rectangular parallelepiped-shaped transparent substrate 121, and four microlenses 124, 125, 126, and 127 formed on one surface (the surface facing the optical branching section 110A) of the substrate 121. The respective optical axes of the four microlenses 124 to 127 are disposed coaxially with the optical axes of four laser lights which are launched from the optical branching section 110A.

The surface of the substrate 121 opposite to the surface on which the microlenses 124 to 127 are disposed is optically bonded to the optical waveguide element 130A. The substrate 121 has a thickness equivalent to the focal lengths of the microlenses 124 to 127. The laser lights incident on the microlenses 124 to 127 are focused on input ends of optical waveguides formed on the side end face of the optical waveguide element 130A.

The optical waveguide element 130A has the substrate 131, and optical waveguides and electrodes formed on the substrate 131. An optical modulating section 140A and the optical combining section 150 are formed on the same substrate with the optical waveguides and the electrodes.

The optical modulating section 140A has four phase modulation sections 141 to 144.

Four input waveguides 231 to 234 extend from a side end of the substrate 131 joined to the microlens array 120A. The input waveguide 231 is connected to the input end of the phase modulation section 141. The input waveguide 232 is connected to the input end of the phase modulation section 142. The input waveguide 233 is connected to the input end of the phase modulation section 143. The input waveguide 234 is connected to the input end of the phase modulation section 144.

The output sides of the phase modulation sections 141 and 142 are connected at an optical combining point 147. Further, the output sides of the phase modulation sections 143 and 144 are connected at an optical combining point 148.

The phase modulation sections 141 to 144 perform binary phase shift keying (BPSK) modulation on input optical signals and output the modulated signals. The phase modulation sections 141 and 142 are set in operation such that their phase changes are orthogonal to each other. Further, the phase modulation sections 143 and 144 are also set in operation such that their phase changes are orthogonal to each other.

In the case of the second embodiment, a QPSK type optical modulator is configured with the phase modulation sections 141 and 142 and the optical combining point 147, and a QPSK type optical modulator is configured with the phase modulation sections 143 and 144 and the optical combining point 148. An optical signal modulated in each of the above-described optical modulators is output to the optical combining section 150.

In the optical modulator 200 of the second embodiment having the configuration described above, laser light is incident on the beam splitter 114 of the optical branching section 110A from the optical fiber collimator 15. The beam splitter 114 transmits 40% of the incident light and reflects 60% of the incident light.

The light transmitted through the beam splitter 114 is incident on the microlens 124 and is focused on the input end of the input waveguide 231 by the microlens 124. On the other hand, the light reflected by the beam splitter 114 is incident on the beam splitter 115. The beam splitter 115 transmits 33% of the incident light and reflects 67% of the incident light.

The light reflected by the beam splitter 115 is incident on the microlens 125 and is focused on the input end of the input waveguide 232 by the microlens 125. On the other hand, the light transmitted through the beam splitter 115 is incident on the beam splitter 116. The beam splitter 116 transmits 50% of the incident light and reflects 50% of the incident light.

The light reflected by the beam splitter 116 is incident on the microlens 126 and is focused on the input end of the input waveguide 233 by the microlens 126. On the other hand, the light transmitted through the beam splitter 116 is reflected by the mirror 113, thereafter, is incident on the microlens 127, and is focused on the input end of the input waveguide 234 by the microlens 127.

The lights introduced into the respective input waveguides 231 and 232 are modulated in the phase modulation sections 141 and 142 and then adjusted, by the application of voltage to the bias electrode portion 134a, so that a phase difference between the lights is predetermined value ($\pi/2$). Thereafter, the lights adjusted so as to have the predetermined phase difference ($\pi/2$) are combined at the optical combining point 147 and become the optical signal QPSK1, and the optical signal QPSK1 is output to the optical combining section 150.

The lights introduced into the respective input waveguides 233 and 234 are modulated in the phase modulation sections 143 and 144 and then adjusted, by the application of voltage to the bias electrode portion 135a, so that a phase difference between the lights is predetermined value ($\pi/2$). Thereafter, the lights adjusted so as to have the predetermined phase difference ($\pi/2$) are combined at the optical combining point 148 and become the optical signal QPSK2, and the optical signal QPSK2 is output to the optical combining section 150.

In the case of the second embodiment, the light which is introduced into each of the input waveguides 231 and 232 has intensity of 40% of the light input from the optical fiber collimator 15. On the other hand, the light which is introduced into each of the input waveguides 233 and 234 has intensity of 10%. Therefore, the optical signal QPSK2 which is generated at the optical combining point 148 has a power, which is a quarter of that of the optical signal QPSK1.

In the optical combining section 150, the optical signal QPSK1 and the optical signal QPSK2 having the above-described power ratio are combined so as to maintain the intensity ratio of these, whereby the 16QAM signal is generated.

In addition, the power ratio (4:1) between the optical signals QPSK1 and QPSK2 may be shifted to some extent due to a manufacturing error of the optical modulator 200. For example, there is also a case where the above-described ratio is 3:1 or 5:1. The above-described ratio can also be adjusted by the transmittance and the reflectance of each of the beam splitters in the optical branching section 110A.

In the optical modulator 200 of the second embodiment, a configuration is made in which the laser light is branched into four laser lights in the optical branching section 110A and the respective laser lights are introduced into the phase modulation sections 141 to 144 by the microlens array 120A. That is, in the second embodiment, branching points of the laser light provided inside the Mach-Zehnder waveguides 134 and 135 of the optical modulator 100 according to the first embodiment are provided outside the substrate as the optical branching section 110A.

In this way, it is possible to reduce the optical branching point which causes an optical loss in the optical waveguide, and thus it is possible to configure an optical modulator in which an optical loss is smaller even if it is compared with the first embodiment. Further, since a waveguide structure for optical branching is not required, it is possible to reduce the size of the substrate 131 made of lithium niobate or the like.

Also in the optical modulator 200 of the second embodiment, the laser lights branched in the optical branching section 110A are focused on the input waveguides 231 to 234 by the microlenses 124 to 127 and introduced into the optical waveguide element 130A. Therefore, there is no difficulty of manufacturing as in a case where optical waveguides formed on different types of substrates are connected to each other and a breakage caused by a difference in expansion coefficient between substrates or a problem of an optical loss caused by joint shift also does not occur.

Third Embodiment

Next, a third embodiment will be described with reference to FIG. 3.

Figure 3:
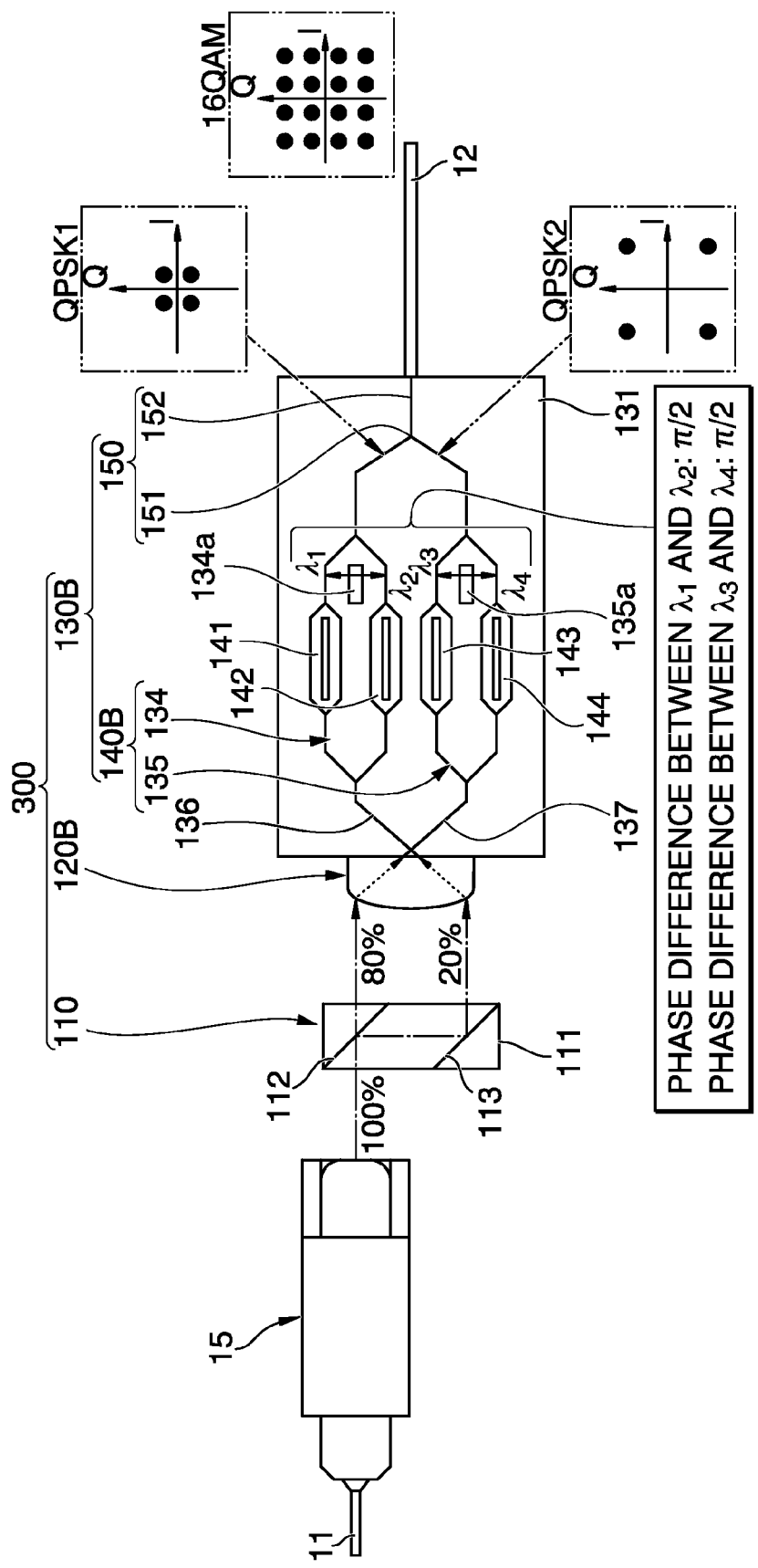
FIG. 3 is a diagram showing an optical modulator according to a third embodiment.

FIG. 3 is a diagram showing an optical modulator according to the third embodiment.

In addition, in the below embodiment, configuration elements which are common to the previous embodiment is denoted by the same reference number and a detailed description thereof will be simplified or omitted.

An optical modulator 300 of the third embodiment has the optical branching section 110, a rod lens 120B, and an optical waveguide element 130B, as shown in FIG. 3. The optical branching section 110 is common to the first embodiment.

The rod lens 120B has a lens surface having a curved surface shape. The flat face of the rod lens 120B which is opposite to the above lens surface is optically bonded to the side end face of the optical waveguide element 130B. Two laser lights branched in and launched from the optical branching section 110 are incident on the lens surface of the rod lens 120B. The laser lights incident on the rod lens 120B are focused on an input end of an optical waveguide formed on the side end face of the optical waveguide element 130B.

The optical waveguide element 130B has the substrate 131, and optical waveguides and electrodes formed on the substrate 131. An optical modulating section 140B and the optical combining section 150 are formed on the same substrate with the optical waveguides and the electrodes.

The optical modulating section 140B has substantially the same configuration as the optical modulating section 140 according to the first embodiment and is different in that the optical modulator 140B has the input waveguides 136 and 137 which cross each other. The input waveguides 136 and 137 have input ends on the side end face of the substrate 131 to which the rod lens 120B is joined and are connected to the Mach-Zehnder waveguides 134 and 135 respectively after they crossed each other at the position of extending to the direction of inside from an end edge of the substrate 131.

In the optical modulator 300 of the third embodiment having the configuration described above, the laser light launched from the optical fiber collimator 15 is incident on the beam splitter 112 of the optical branching section 110. The beam splitter 112 transmits 80% of the incident light and reflects 20% of the incident light.

The light transmitted through the beam splitter 112 is incident on the rod lens 120B and is focused on the input end of the input waveguide 137 by the rod lens 120B. The light introduced into the input waveguide 137 is input to the Mach-Zehnder waveguide 135.

On the other hand, the light reflected by the beam splitter 112 is reflected by the mirror 113, thereafter, is incident on the rod lens 120B, and is focused on the input end of the input waveguide 136 by the rod lens 120B. The light introduced into the input waveguide 136 is input to the Mach-Zehnder waveguide 134.

Therefore, in the optical modulator 300 of the third embodiment, the intensity ratio of the lights which are input to the Mach-Zehnder waveguides 134 and 135 is reversed to that in the first embodiment.

The light introduced into the Mach-Zehnder waveguide 134 is branched at the input end. Next, the branched lights are modulated in the phase modulation sections 141 and 142 and then adjusted, by the application of voltage to the bias electrode portion 134a, so that a phase difference between the branched lights is predetermined value ($\pi/2$). Thereafter, the lights are combined at the output end of the Mach-Zehnder waveguide 134, thereby generating the optical signal QPSK1, and the optical signal QPSK1 is output to the optical combining section 150.

The light introduced into the Mach-Zehnder waveguide 135 is branched at the input end. Next, the branched lights are modulated in the phase modulation sections 143 and 144 and then adjusted so as to become a predetermined phase difference ($\pi/2$) by the application of voltage to the bias electrode portion 135a. Thereafter, the lights are combined at the output end of the Mach-Zehnder waveguide 135, thereby generating the optical signal QPSK2, and the optical signal QPSK2 is output to the optical combining section 150.

In the case of the third embodiment, since the light introduced into the input waveguide 136 is light with intensity of 20% which is branched by the beam splitter 112, the optical signal QPSK1 which is output from the Mach-Zehnder waveguide 134 has a power, which is a quarter of that of the optical signal QPSK1 generated from the light having intensity of 80% in the Mach-Zehnder waveguide 135.

In the optical combining section 150, the optical signal QPSK1 and the optical signal QPSK2 having the above-described power ratio are combined so as to maintain the intensity ratio of these, whereby the 16QAM signal is generated.

In addition, the power ratio (4:1) between the optical signals QPSK1 and QPSK2 may be shifted to some extent due to a manufacturing error of the optical modulator 100. For example, there is also a case where the above-described ratio is 3:1 or 5:1. The above-described ratio can also be adjusted by the transmittance and the reflectance of the beam splitter 112 in the optical branching section 110.

As described in detail above, in the optical modulator 300 of the third embodiment, the laser light is branched at a predetermined power ratio in the optical branching section 110 and these laser lights are introduced into the optical waveguide element 130B through the rod lens 120B. Also in a case of using the rod lens 120B, it is possible to obtain effects as same as those in the previous first embodiment.

Fourth Embodiment

Next, a fourth embodiment will be described with reference to FIG. 4.

Figure 4:
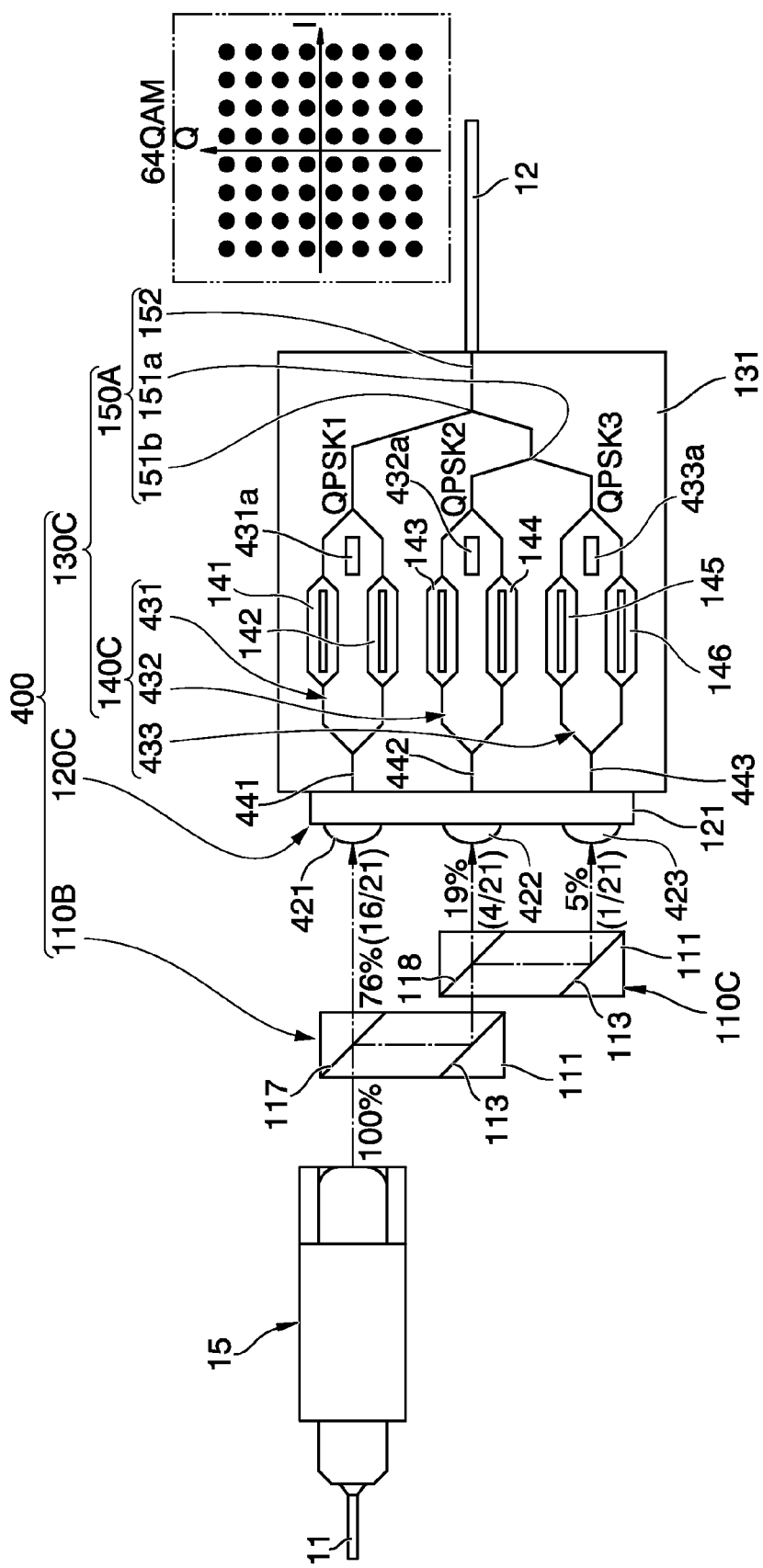
FIG. 4 is a diagram showing an optical modulator according to a fourth embodiment.

FIG. 4 is a diagram showing an optical modulator according to the fourth embodiment.

In addition, in the below embodiment, configuration elements which are common to the previous embodiment is denoted by the same reference number and a detailed description thereof will be simplified or omitted.

An optical modulator 400 of the fourth embodiment has two optical branching sections 110B and 110C, a microlens array 120C, and an optical waveguide element 130C, as shown in FIG. 4.

The optical branching section 110B has a configuration in which a beam splitter 117 and the mirror 113 disposed parallel to each other are provided in the glass base 111. The beam splitter 117 transmits 76% of the incident light and reflects 24% of the incident light. The mirror 113 is a total reflection mirror.

The optical branching section 110C has a configuration in which a beam splitter 118 and the mirror 113 disposed parallel to each other are provided in the glass base 111. The beam splitter 118 transmits 80% of the incident light and reflects 20% of the incident light.

The optical branching sections 110B and 110C are used in combination. One laser light of two laser lights which are launched from the optical branching section 110B is incident on the microlens array 120C and the other laser light is incident on the optical branching section 110C. Two laser lights which are launched from the optical branching section 110C are incident on the microlens array 120C.

An antireflective film (an AR coat) or the like may be formed on the light incident surface or the light launched surface of each of the optical branching sections 110B and 110C.

The microlens array 120C has the rectangular parallelepiped-shaped transparent substrate 121, and three microlenses 421, 422, and 423 formed on one surface (the surface facing the optical branching sections 110B and 110C) of the substrate 121. The optical axis of the microlens 421 is disposed coaxially with the optical axis of the laser light which is launched from the optical branching section 110B. The optical axes of the microlenses 422 and 423 are disposed coaxially with the optical axes of two laser lights which are launched from the optical branching section 110C.

The surface of the substrate 121 opposite to the surface on which the microlenses 421 to 423 are disposed is optically bonded to the optical waveguide element 130C. The substrate 121 has a thickness equivalent to the focal lengths of the microlenses 421 to 423. The laser lights incident on the microlenses 421 to 423 are focused on input ends of optical waveguides formed on the side end face of the optical waveguide element 130C.

The optical waveguide element 130C has the substrate 131, and optical waveguides and electrodes formed on the substrate 131. An optical modulating section 140C and an optical combining section 150A are formed on the same substrate with the optical waveguides and the electrodes.

The optical modulating section 140C has Mach-Zehnder waveguides 431, 432, and 433. The Mach-Zehnder waveguide 431 has the phase modulation sections 141 and 142. The Mach-Zehnder waveguide 432 has the phase modulation sections 143 and 144. The Mach-Zehnder waveguide 433 has the phase modulation sections 145 and 146. Each of the phase modulation sections 141 to 146 has a Mach-Zehnder waveguide and an electrode.

Three input waveguides 441, 442, and 443 extend from a side end of the substrate 131 joined to the microlens array 120C. The input waveguides 441, 442, and 443 are respectively connected to the Mach-Zehnder waveguides 431, 432, and 433 each having two arms. The phase modulation sections 141 and 142 are provided on the respective arms of the Mach-Zehnder waveguide 431. A bias electrode portion 431$a$ is provided on the output end side of the Mach-Zehnder waveguide 431. The phase modulation sections 143 and 144 are provided on the respective arms of the Mach-Zehnder waveguide 432. A bias electrode portion 432$a$ is provided on the output end side of the Mach-Zehnder waveguide 432. The phase modulation sections 145 and 146 are provided on the respective arms of the Mach-Zehnder waveguide 433. A bias electrode portion 433$a$ is provided on the output end side of the Mach-Zehnder waveguide 433.

The phase modulation sections 141 to 146 perform binary phase shift keying (BPSK) modulation on input optical signals and output the modulated signals. The phase modulation sections 141 and 142 are set in operation such that their phase changes are orthogonal to each other. Similarly, the phase modulation sections 143 and 144 and the phase modulation sections 145 and 146 are also set in operation such that the phase changes of each pair are orthogonal to each other. Each of the Mach-Zehnder waveguides 431, 432, and 433 configures a QPSK (quadri-phase shift keying) type optical modulator. An optical signal modulated in each of the Mach-Zehnder waveguides 431, 432, and 433 is output to the optical combining section 150A.

The optical combining section 150A has an optical coupling portion 151$a$ converging optical waveguides which respectively extend from output ends of the Mach-Zehnder waveguides 432 and 433, an optical coupling portion 151$b$ converging an optical waveguide which extends from the optical coupling portion 151$a$ and an optical waveguide which extends from the Mach-Zehnder waveguide 431, and the output waveguide 152 extending from the optical coupling portion 151$b$ to a side end of the substrate 131. Optical signals which are output from the Mach-Zehnder waveguides 431 to 433 are respectively combined at the optical coupling portions 151$a$ and 151$b$, and thus 64QAM optical signal is generated. The generated 64QAM signal is output to the optical fiber 12 through the output waveguide 152.

In the optical modulator 400 of the fourth embodiment having the configuration described above, the laser light launched from the optical fiber collimator 15 is incident on the beam splitter 117 of the optical branching section 110B. The beam splitter 117 transmits 76% of the incident light and reflects 24% of the incident light. The light transmitted through the beam splitter 117 is incident on the microlens 421 and is focused on the input end of the input waveguide 441 by the microlens 421.

The light reflected by the beam splitter 117 is reflected by the mirror 113 of the optical branching section 110B and is then incident on the beam splitter 118 of the optical branching section 110C. The beam splitter 118 transmits 80% of the incident light and reflects 20% of the incident light. The light transmitted through the beam splitter 118 is incident on the microlens 422 and is focused on the input end of the input waveguide 442 by the microlens 422.

The light reflected by the beam splitter 118 is reflected by the mirror 113 of the optical branching section 110C, thereafter, is incident on the microlens 423, and is focused on the input end of the input waveguide 443 by the microlens 423.

The light introduced into the input waveguide 441 is branched at the input end of the Mach-Zehnder waveguide 431. Next, the branched lights are modulated in the phase modulation sections 141 and 142 and then adjusted, by the application of voltage to the bias electrode portion 431$a$, so that a phase difference between the branched lights is predetermined value ($\pi/2$). Thereafter, the lights are combined at the output end of the Mach-Zehnder waveguide 431 and become the optical signal QPSK1, and the optical signal QPSK1 is output to the optical combining section 150A.

The light introduced into the input waveguide 442 is branched at the input end of the Mach-Zehnder waveguide 432. Next, the branched lights are modulated in the phase modulation sections 143 and 144 and then adjusted, by the application of voltage to the bias electrode portion 432$a$, so that a phase difference between the branched lights is predetermined value ($\pi/2$). Thereafter, the lights are combined at the output end of the Mach-Zehnder waveguide 432 and become the optical signal QPSK2, and the optical signal QPSK2 is output to the optical combining section 150.

The light introduced into the input waveguide 443 is branched at the input end of the Mach-Zehnder waveguide 433. Next, the branched lights are modulated in the phase modulation sections 145 and 146 and then adjusted, by the application of voltage to the bias electrode portion 433$a$, so that a phase difference between the branched lights is predetermined value ($\pi/2$). Thereafter, the lights are combined at the output end of the Mach-Zehnder waveguide 433—and become an optical signal QPSK3, and the optical signal QPSK3 is output to the optical combining section 150.

In the case of the fourth embodiment, the lights which are introduced into the input waveguides 441 to 443 are lights respectively adjusted so as to have a predetermined power ratio (16:4:1) by the beam splitters 117 and 118. Therefore, the power ratio among the optical signals QPSK1, QPSK2, and QPSK3 which are generated in the respective Mach-Zehnder waveguides 431 to 433 also becomes 16:4:1.

In the optical combining section 150A, the optical signal QPSK1, the optical signal QPSK2, and the optical signal QPSK3 are combined so as to maintain the intensity ratio of these, whereby the 64QAM signal is generated.

In addition, the power ratio (16:4:1) among the optical signals QPSK1, QPSK2, and QPSK3 may be shifted to some extent due to a manufacturing error of the optical modulator 400. The above-described ratio can also be adjusted by the transmittance and the reflectance of each of the beam splitters in the optical branching sections 110B and 110C.

As described in detail above, also in the optical modulator 400 of the fourth embodiment, the laser light is branched by using the optical branching sections 110B and 110C so that the branched lights have a predetermined power ratio, and these laser lights are introduced into the optical waveguide element 130C through the microlens array 120C. By this reason, comparing with a case where an optical signal power adjustment section is provided on a lithium niobate substrate, it is possible to reduce an optical loss.

Further, since the power adjustment section as described above need not be formed on a lithium niobate substrate, it is possible to reduce the size of the substrate 131 made of lithium niobate or the like.

Further, the laser lights branched in the optical branching sections 110B and 110C are focused by the microlenses 421 to 423 and introduced into the optical waveguide element 130C, and therefore, there is no difficulty of manufacturing as in a case where optical waveguides formed on different types of substrates are connected to each other and a breakage caused by a difference in expansion coefficient between substrates or a problem of an optical loss caused by joint shift also does not occur.

Fifth Embodiment

Next, a fifth embodiment will be described with reference to FIG. 5.

FIG. 5 is a diagram showing an optical modulator according to the fifth embodiment.

In addition, in the below embodiment, configuration elements which are common to the previous embodiment is denoted by the same reference number and a detailed description thereof will be simplified or omitted.

An optical modulator 500 of the fifth embodiment has an optical branching section 110D, the microlens array 120C, and the optical waveguide element 130C, as shown in FIG. 5. That is, the optical modulator 500 has a configuration in which only the optical branching section is changed with respect to the optical modulator 400 shown in FIG. 4.

The light branching section 110D has a configuration in which beam splitters 511 and 512 and the mirror 113 disposed parallel to each other are provided in the glass base 111. The beam splitter 511 transmits 76% of the incident light and reflects 24% of the incident light. The beam splitter 512 transmits 20% of the incident light and reflects 80% of the incident light. The mirror 113 is a total reflection mirror.

The single optical branching section 110D can generate three laser lights, which are generated by the two optical branching sections 110B and 110C in the fourth embodiment. In the optical branching section 110D, the laser light launched from the optical fiber collimator 15 is incident on the beam splitter 511.

The light transmitted through the beam splitter 511 is input to the input waveguide 441 through the microlens 421. On the other hand, the light reflected by the beam splitter 511 is incident on the beam splitter 512.

The light reflected by the beam splitter 512 is input to the input waveguide 442 through the microlens 422. On the other hand, the light transmitted through the beam splitter 512 is reflected by the mirror 113. The light reflected by the mirror 113 is incident on the microlens 423 and is input to the input waveguide 443.

The lights input to the respective input waveguides 441 to 443 are lights adjusted so as to have a predetermined power ratio (16:4:1) by the beam splitters 511 and 512. Therefore, the optical signals QPSK1, QPSK2, and QPSK3 which are respectively generated in the Mach-Zehnder waveguides 431 to 433 also have the above-described power ratio, and by combining these lights with maintaining the intensity ratio of these, it is possible to obtain the 64QAM signal.

As described above, the optical modulator 500 of the fifth embodiment can operate in the same manner as that of the optical modulator 400 according to the fourth embodiment and it is possible to obtain the same effects. In addition, according to the fifth embodiment, by providing smaller optical branching section 110D it is possible to aim in the entire size reduction of the optical modulator.

In addition, the configuration of the optical combining section in each of the embodiments described above is illustrative and is not limited to the configuration described in this specification. As the optical combining section, it is sufficient only if it is a configuration capable of combining lights with maintaining the power ratio between the respective phase-modulated lights which are incident thereon.

REFERENCE SIGNS LIST 100, 200, 300, 400, 500: optical modulator
110, 110A, 110B, 110C, 110D: optical branching section
112, 114, 115, 116, 117, 118, 511, 512: beam splitter
113: mirror
120, 120A, 120C: microlens array (lens)
120B: rod lens (lens)
131: substrate
141, 142, 143, 144, 145, 146: phase modulation section
150, 150A: optical combining section

The invention claimed is:

1. An optical modulator comprising:
an optical branching section having at least one beam splitter, which has a transmittance of 80% and a reflectance of 20%, and a mirror and configured to branch input light and to output a plurality of lights having different intensities from one another;
a lens configured to converge the plurality of lights;
an optical modulating section having a plurality of Mach-Zehnder waveguides, the plurality of Mach-Zehnder waveguides having at least a first Mach-Zehnder waveguide and a second Mach-Zehnder waveguide, each arm of the first Mach-Zehnder waveguide having a first phase modulation section, each arm of the second Mach-Zehnder waveguide having a second phase modulation section, the first phase modulation section being configured to perform binary phase shift keying modulation on a first light output from the lens, the second phase modulation section being configured to perform binary phase shift keying modulation on a second light output from the lens and having different intensity from the intensity of the first light; and
an optical combining section configured to combine a plurality of phase-modulated lights which are output from the plurality of phase modulation sections, and output 16 quadrature amplitude modulation signal light.

2. The optical modulator according to claim 1, wherein the plurality of phase modulation sections are formed on a single substrate.

3. The optical modulator according to claim 2, wherein the lens includes at least one of a microlens, a microlens array, and a rod lens.

4. The optical modulator according to claim 2, further comprising:
an optical element which inputs collimated light to the optical branching section.

5. The optical modulator according to claim 2, wherein at least one of the beam splitter and the mirror has a dielectric multilayer film.

6. The optical modulator according to claim 1, wherein the lens includes at least one of a microlens, a microlens array, and a rod lens.

7. The optical modulator according to claim 1, further comprising:
   an optical element which inputs collimated light to the optical branching section.

8. The optical modulator according to claim 7, wherein at least one of the beam splitter and the mirror has a dielectric multilayer film.

9. The optical modulator according to claim 1, wherein at least one of the beam splitter and the mirror has a dielectric multilayer film.

10. The optical modulator according to claim 1, wherein the lens is directly fixed to the phase modulation section.

11. The optical modulator according to claim 1, wherein the lens is fixed to the phase modulation section through other optical element.

12. An optical modulator comprising:
    an optical branching section configured to branch input light, the optical branching section having a first beam splitter which has a transmittance of 40% and a reflectance of 60% for incident light, a second beam splitter which has a transmittance of 33% and a reflectance of 67% for incident light, a third beam splitter which has a transmittance of 50% and a reflectance of 50% for incident light, and a mirror;
    a lens configured to converge the respective lights branched in the optical branching section;
    a plurality of phase modulation sections each configured to perform phase modulation of each light which is input thereto through the lens; and
    an optical combining section configured to combine a plurality of phase-modulated lights which are output from the plurality of phase modulation sections, and output 16 quadrature amplitude modulation signal light.

* * * * *